(12) United States Patent
Kawauchi

(10) Patent No.: US 6,519,709 B1
(45) Date of Patent: Feb. 11, 2003

(54) METHOD AND DEVICE FOR TRANSFERRING DATA BETWEEN TWO ASYNCHRONOUSLY CLOCKED CIRCUITS VIA A BUFFER BY RENEWING AN ACCESS POINTER THEREOF ONLY WHEN EFFECTIVE DATA IS RECEIVED

(75) Inventor: Yoshikazu Kawauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/421,137

(22) Filed: Oct. 19, 1999

(30) Foreign Application Priority Data

Oct. 22, 1998 (JP) .......................................... 10-318322

(51) Int. Cl.[7] .............................................. G06F 13/42
(52) U.S. Cl. ........................ 713/400; 713/500; 713/600
(58) Field of Search ................................. 713/400, 500, 713/600

(56) References Cited

U.S. PATENT DOCUMENTS

| | | | | |
|---|---|---|---|---|
| 5,555,524 A | * | 9/1996 | Castellano | 365/221 |
| 5,668,767 A | * | 9/1997 | Barringer | 365/221 |
| 5,720,032 A | * | 2/1998 | Picazo, Jr. et al. | 395/200.2 |
| 5,956,748 A | * | 9/1999 | New | 711/149 |
| 5,982,741 A | * | 11/1999 | Ethier | 370/201 |
| 6,101,329 A | * | 8/2000 | Graef | 395/872 |

FOREIGN PATENT DOCUMENTS

| | | |
|---|---|---|
| JP | 61-196497 | 8/1986 |
| JP | 4-81142 | 3/1992 |
| JP | 6-69913 | 3/1994 |
| JP | 7-30528 | 1/1995 |
| JP | 6-6333 | 1/1997 |
| TW | 406265 | 9/1998 |

* cited by examiner

*Primary Examiner*—Thomas Lee
*Assistant Examiner*—Jinsong Hu
(74) *Attorney, Agent, or Firm*—Scully, Scott, Murphy & Presser

(57) ABSTRACT

A clock synchronizing circuit that can be simplified by reducing storage capacity required for synchronization. The clock synchronizing circuit including a memory being accessible independently to its input and output, a write pointer generating circuit, a data holding detection circuit and a read pointer generating circuit and, while non-existence of data in the memory is detected by a data holding detection circuit, re-initialization of either or both input and output clocks is carried out on a read pointer generating circuit and, after completion of writing of data into the memory, data inputted in synchronization with the input clock is outputted in synchronization with the output clock by renewing each pointer using the write pointer generating circuit and the read pointer generating circuit and by writing and reading data into or from the memory.

12 Claims, 14 Drawing Sheets

FIG.5

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| (1) | | | 4 (2) | | | e | | | 7 (2) | | | | h | 10 (3) | | | | | k | 13 (1) | |
| (2) | | c | | | 5 (3) | | | f | | | 8 (1) | | | | i | 11 (1) | | | | 1 | 14 (2) |
| (3) | 3 (1) | | | d | | | 6 (1) | | | g | | 9 (2) | | | | | i | 12 (2) | | | |

FIG. 7

|     | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|-----|---|---|---|---|---|---|---|---|---|----|----|----|----|----|----|----|----|----|----|----|----|----|
| (1) |   |   |   |   |   |   |   |   |   |    | i  |    |    |    |    | m  |    |    |    |    |    |    |
| (2) |   | e |   |   |   | g |   | h |   |    |    |    | k  |    |    |    |    | 12(1) | n |    |    | 14(3) |
| (3) | 4(1) |   | 5(2) | f | 6(3) |   | 7(1) |   | 8(2) | i | 9(3) | 10(1) | l | 11(3) |    |    |    |    | 13(2) | o |    |

METHOD AND DEVICE FOR TRANSFERRING DATA BETWEEN TWO ASYNCHRONOUSLY CLOCKED CIRCUITS VIA A BUFFER BY RENEWING AN ACCESS POINTER THEREOF ONLY WHEN EFFECTIVE DATA IS RECEIVED

BACKGROUND OF THE INVENTION

1. Field of the Invention

The present invention relates to method of synchronizing clock and device for use in such method to output data inputted in synchronization with a first clock in synchronization with a second clock which can be used suitably, for example, for a computer network.

2. Description of the Related Art

In some of conventional local area networks (LAN), as shown in FIG. 12, personal computers $31_1$ and $31_2$ are connected through packet assembling and disassembling devices $32_1$ and $32_2$, interfaces $33_1$ and $33_2$ and packet sending/receiving devices $34_1$ and $34_2$ to a network 35 of LAN. In LANs, a packet is used to send or receive data between a personal computer and the network 35 of LANs.

In some cases of transmission of packets, though there is no difference in frequency between a clock signal of an input packet and that of an output packet, a variation exists between a frequency of the clock signals of the input packet and that of the output packet. Also, in some cases, even if there is the difference as described above, there is a variation between a frequency of the clock signal of the input packet and that of the output packet. In such a case, in order to correctly pass an inputted packet to an output side, it is vital to output data inputted in synchronization with the input clock in synchronization with the output clock (i.e., it means that a clock of data is converted from the input clock to the output clock). However, in the case of sequence data such as a packet, a conversion of a clock is impossible by detection of a rise or fall of a pulse due to omission or duplication of data.

Because of this, as shown in FIG. 13, packet assembling/disassembling devices $32_1$ and $32_2$ of a LAN are provided with a clock synchronizing circuit used to convert a clock. As depicted in FIG. 13, the clock synchronizing circuit contains a memory 42, a write pointer generating circuit 45, a data termination detecting circuit 46 and a read pointer generating circuit 47. At the start of the conversion of a clock, the memory 42 is initialized and, at the same time, the write pointer generating circuit 45 initializes a write pointer in response to an input clock and generates an initialized write pointer, while the read pointer generating circuit 47 initializes a read pointer in response to an output clock and generates an initialized read pointer (Step SQ1 and SQ2 in FIG. 14). Until a packet data is inputted to a write input of the memory 42, the generated write pointer is not renewed (Step SQ3). When the packet data is inputted (Step SQ3), the memory 42 writes, in response to the input clock signal, a write data unit out of the inputted packet data into a storage position designated by the write pointer outputted from the write pointer generating circuit 45 (Step SP4). Then, the write pointer is renewed (Step SQ5).

Every time the write pointer is renewed, a judgement on whether writing of all packet data is terminated or not is made by a data termination detecting circuit 46 (Step SQ6). If the writing is not terminated, a subsequent write data unit of the packet data is written into a write position of a memory 42 designated by the write pointer renewed by the write pointer generating circuit 45.

If the judgement on termination of writing the packet data is positive (in the case of "YES" of Step SQ6), a packet write termination instructing signal is generated (Step SQ7) and a signal for processing packet reading is fed and, at the same time, in the packet writing processing, the operation returns back to Step SQ3 which is in the waiting state for inputting of packet data and to wait for inputting of a subsequent packet data.

At the same time when the packet writing processing is in the state of waiting for packet data, reading processing that had been in the standby state is started in response to the packet writing termination instructing signal (in the case of "YES" in Step SQ8) When this packet reading processing is started, a read data unit of the packet is read from the reading position of the memory 42 designated by the read pointer that had been initialized (Step SQ9) and the read data unit is outputted as a first read data unit of the packet written in the memory 42. At the same when this reading is carried out, the read pointer is renewed to be a read pointer having a subsequent data unit (Step SQ10).

Every time such reading pointer is renewed, a judgement on whether reading of packet data is terminated or not is carried out (Step SQ11). If it is not terminated (in the case of "NO" in Step SQ11), a subsequent read data unit of packet data is read from a reading position of the memory 42 designated by the renewed read pointer.

If the judgement on termination of reading the packet data is positive (in the case of "YES" of Step SQ11), the operation returns back to Step SQ8 being in the standby state for the start of the packet reading and to wait for a packet writing termination instructing signal of the subsequent packet until a signal of informing the termination of writing the packet is received. Thus, the above procedure allows data inputted in synchronization with an input clock to be outputted in synchronization with an output clock (i.e., when data is inputted or outputted, a clock of data can be converted from the input clock to the output clock).

However, as described above, though the conventional synchronizing circuit allows packet data inputted in synchronization with an input clock to be outputted in synchronization with an output clock, in order to achieve the synchronization, only one technique is available wherein, after a whole packet is written into the memory 42 by an input clock signal having the number of writing units constituting one packet, the packet is read by the output signal having the number of reading units constituting the packet. However, this technique suffers a shortcoming that one packet of storage capacity is unavoidably required for outputting packet data inputted in synchronization with an input clock to be outputted in synchronization with an output clock, thus causing a delay of sending and receiving a packet caused by a temporary storage. Moreover, another disadvantage is that a major portion of a chip area is occupied by the synchronizing circuit in integration process on a semiconductor chip.

SUMMARY OF THE INVENTION

In view of the above, it is an object of the present invention to provide method of synchronizing clock and device for use in such method which allows a reduction in storage capacity required for outputting data inputted in synchronization with an input clock in synchronization with an output clock, thus achieving simplification, miniaturization and drop in prices of the synchronizing device.

According to a first aspect of the present invention, there is provided a method of synchronizing a clock for transferring data from a first circuit operated at a first clock through a storing means being accessible independently to its input and output to a second circuit operated by a second clock comprising the steps of:

storing data fed by the storing means;
   detecting whether data stored in the storing means is effective data;
   renewing, if a decision is positive, an access pointer of the storing means in response to the clock;
   re-initializing, if a decision is negative, the access pointer of the storing means in response to the clock; and
   outputting data inputted in synchronization with the first clock in synchronization with the second clock by accessing the storing means using the access pointer.

In the foregoing, a preferable mode is one wherein a frequency of first clock is different from that of second clock.

Also, a preferable mode is one wherein width of storage capacity N of the storing means is a sum of a width of storage capacity given by a following formula (1) derived in the case where an output clock is faster than an input clock and a width of storage capacity given by a following formula (2) derived in the case where the input clock is faster than the output clock;

$$N<n+1 \qquad (1)$$

$$n \leq N \qquad (2)$$

where $n=|A-B| \times L / \max (A, B)$, wherein A is a frequency of the first clock, B is a frequency of the second clock and L is a maximum packet length, and max (A, B) represents that max $(A, B)=A$ if $A \geq B$ and max $(A, B)=B$ if $A<B$. N is an arbitrary natural number.

Also, a preferable mode is one wherein the re-initialization is performed only on the access pointer of the second circuit.

Also, a preferable mode is one wherein the re-initialization is performed only on the access pointer of the first circuit.

Furthermore, a preferable mode is one wherein the re-initialization is performed on the access pointers of both first and second circuits.

According to a second aspect of the present invention, there is provided a method of synchronizing a clock for transferring data from a first circuit operated at a first clock through a storage means being accessible independently to its input and output to a second circuit operated by a second clock comprising:

a storing means being accessible independently to its input and output;
   a detecting means to detect whether data stored in the storing means is effective data;
   an access pointer generating means to renew an access pointer of the storing means, when the detecting means shows a positive decision, in response to the clock and to reinitialize an access pointer of the storing means, when the detecting means shows a negative decision, in response to the clock; and
   a means to output data inputted in synchronization with the first clock in synchronization with the second clock by accessing the storing means using the access pointer outputted from the access pointer generating means.

In the foregoing, it is preferable that a frequency of the first clock is different from that of the second clock.

Also, it is preferable that width of storage capacity N of the storing means is a sum of a width of storage capacity given by a following formula (3) derived in the case where an output clock is faster than an output clock and a width of storage capacity given by a following formula (4) derived in the case where the input clock is faster than the output clock;

$$N<n+1 \qquad (3)$$

$$n \leq N \qquad (4)$$

where $n=|A-B| \times L / \max (A, B)$, wherein A is a frequency of the first clock, B is a frequency of the second clock and L is a maximum packet length, and max (A, B) represents that max $(A, B)=A$ if $A \geq B$ and max $(A, B)=B$ if $A<B$. N is an arbitrary natural number.

Also, it is preferable that re-initialization of the access pointer using the access pointer generating means is performed only on the access pointer of the second circuit.

Also, it is preferable that re-initialization of the access pointer using the access pointer generating means is performed only on the access pointer of said first circuit.

Furthermore, it is preferable that the re-initialization of the access pointer using the access pointer generating means is performed on the access pointer of both first and second circuits.

BRIEF DESCRIPTION OF THE DRAWINGS

The above and other objects, advantages and features of the present invention will be more apparent from the following description taken in conjunction with the accompanying drawings in which:

FIG. 5 is a diagram expanding a storage content of a memory in time sequence to explain operations of the clock synchronizing circuit operated at the frequency in which the frequency of an output clock is higher than that of an input clock;

FIG. 7 is a diagram expanding a storage content of a memory in time series to explain operations of the clock synchronizing circuit operated at the frequency in which the frequency of an output clock is higher than that of an input clock;

DETAILED DESCRIPTION OF THE PREFERRED EMBODIMENTS

Best modes of carrying out the present invention will be described in further detail using various embodiments with reference to the accompanying drawings.

First Embodiment

Figure 1:
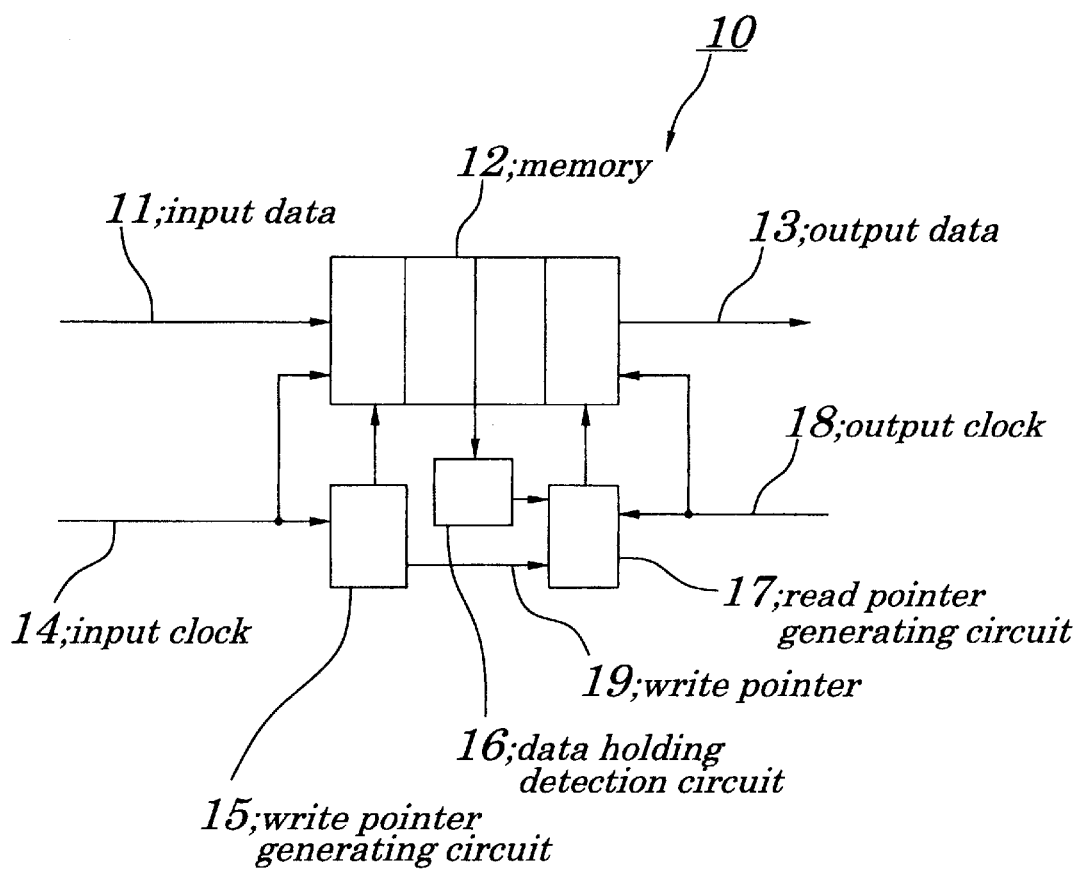
FIG. 1 is a block diagram showing electrical configurations of a clock synchronizing circuit according to a first embodiment of the present invention.
Figure 2:
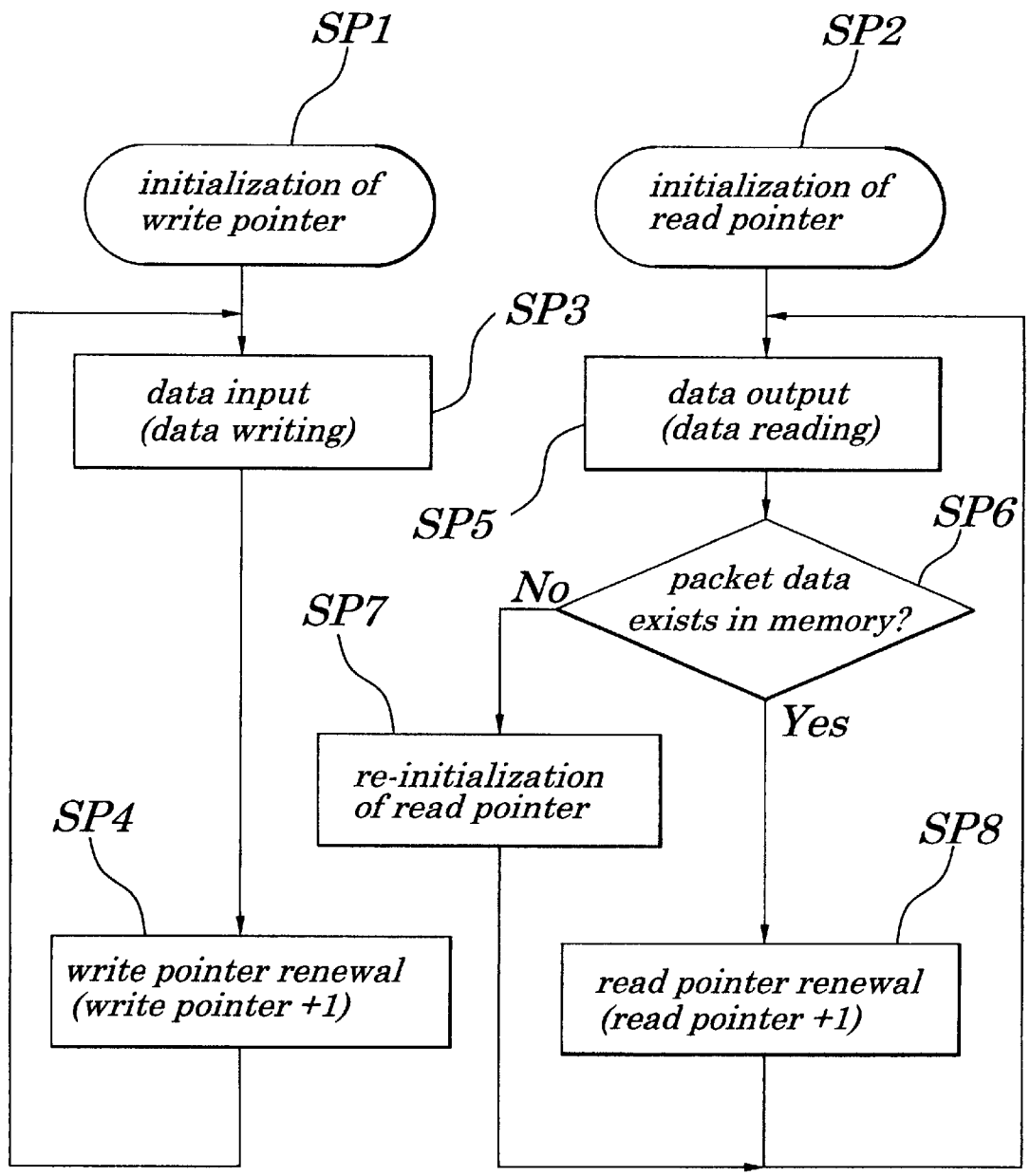
FIG. 2 is a flowchart showing operations of the clock synchronizing circuit.
Figure 3:
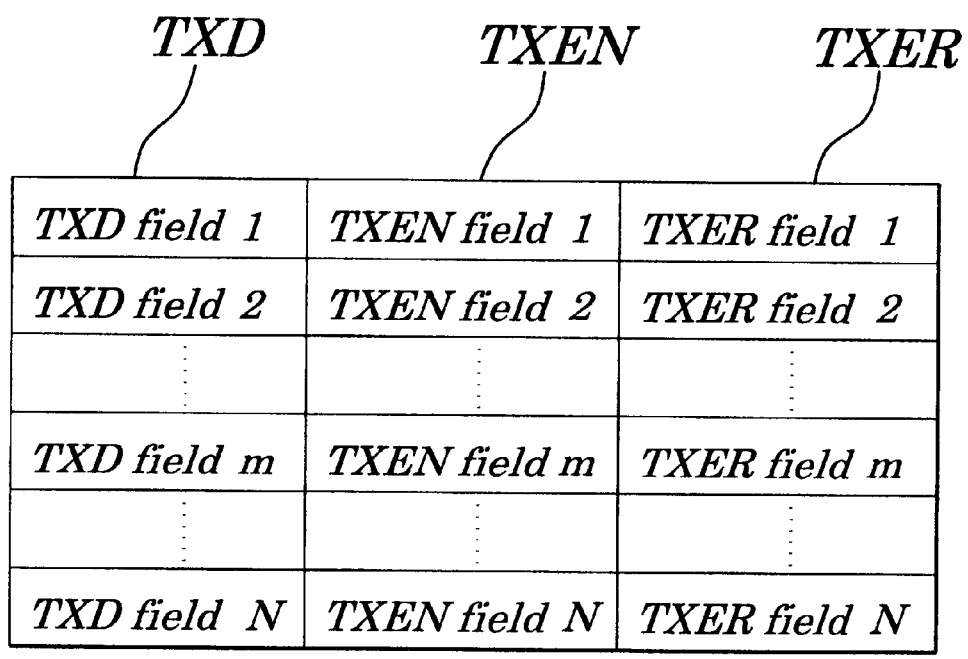
FIG. 3 is a schematic diagram showing a format of data strings written into a memory constituting the clock synchronizing circuit.
Figure 4:
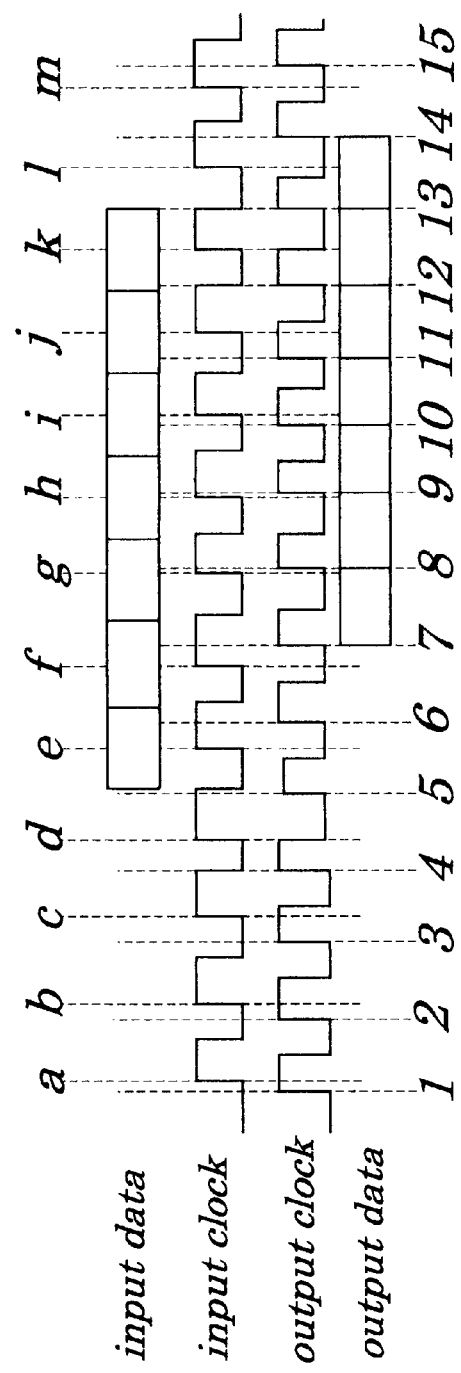
FIG. 4 is a timing chart to explain operations of the clock synchronizing circuit operated at the frequency in which the frequency of an input clock is higher than that of an output clock.
Figure 6:
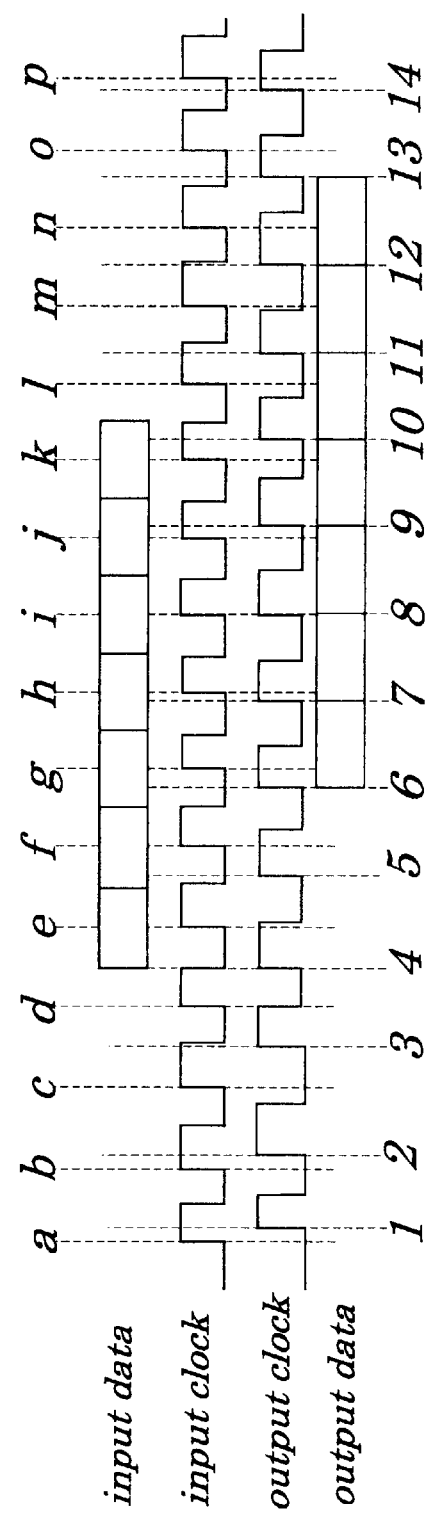
FIG. 6 is a timing chart to explain operations of the clock synchronizing circuit operated at the frequency in which the frequency of an output clock is higher than that of an input clock.

FIG. 1 is a block diagram showing electrical configurations of a clock synchronizing circuit according to a first embodiment of the present invention. FIG. 2 is a flowchart showing operations of the clock synchronizing circuit. FIG. 3 is a schematic diagram showing a format of data strings written into a memory constituting the clock synchronizing circuit. FIG. 4 is a timing chart to explain operations of the clock synchronizing circuit operated at the frequency in which the frequency of an input clock is higher than that of an output clock. FIG. 5 is a diagram expanding a storage content of a memory in time sequence to explain operations of an clock synchronizing circuit operated at the frequency in which the frequency of an output clock is higher than that of an input clock. FIG. 6 is a timing chart to explain operations of the clock synchronizing circuit operated at the frequency in which the frequency of an output clock is higher than that of an input clock. FIG. 7 is a diagram expanding storage contents of the memory in time sequence to explain operations of the clock synchronizing circuit operated at the frequency in which the frequency of an input clock is higher than that of an output clock.

Figure 12:
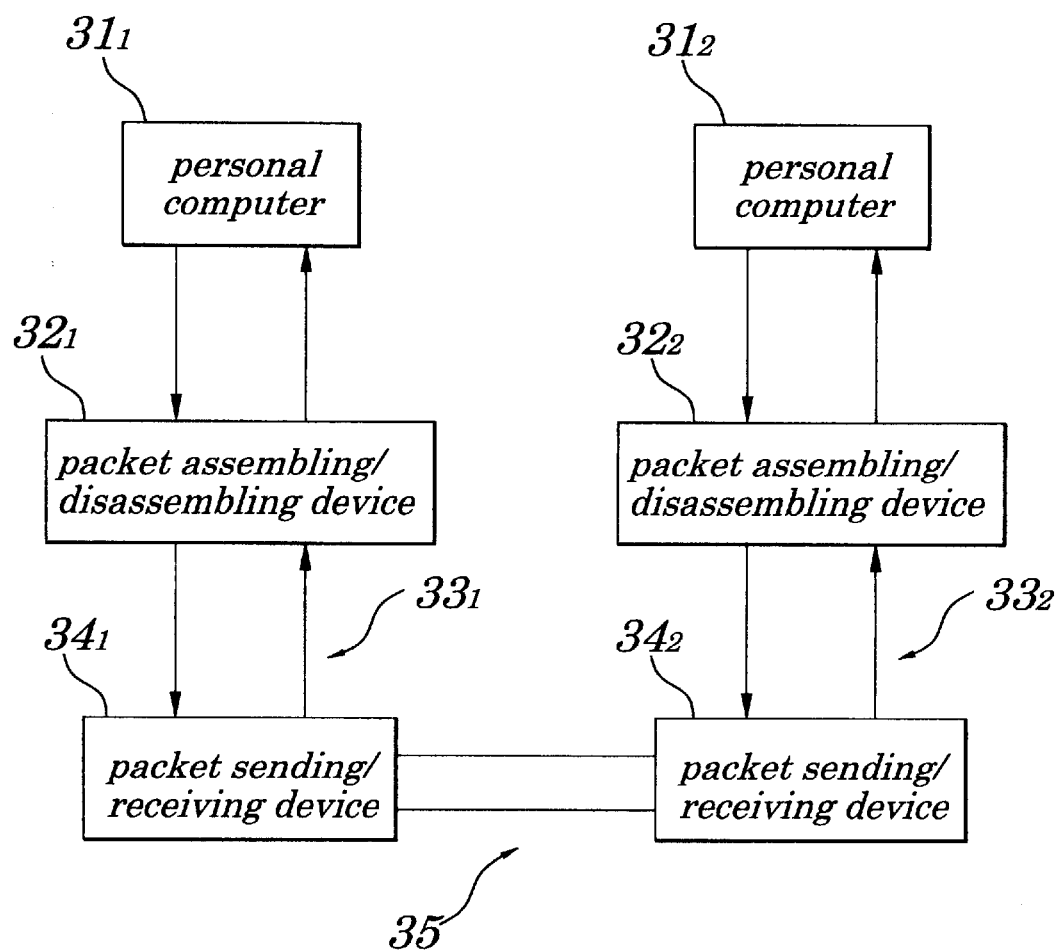
FIG. 12 is a block diagram showing a local area network.
Figure 13:
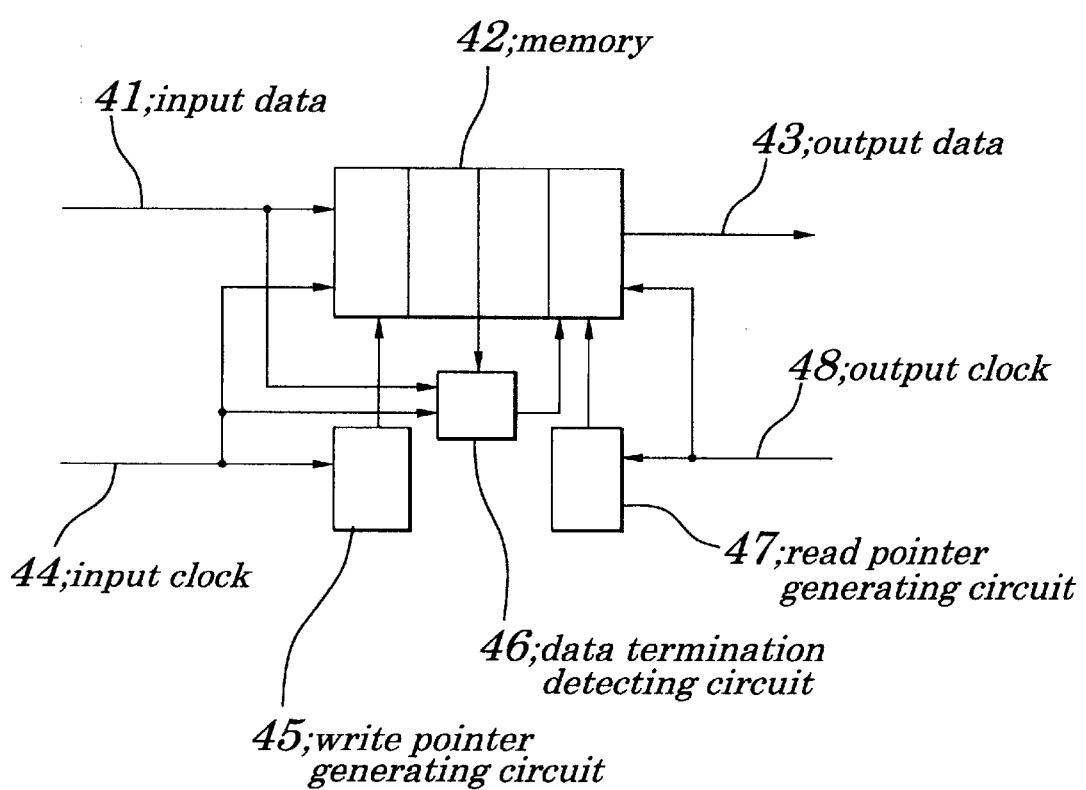
FIG. 13 is a block diagram showing a conventional clock synchronizing circuit.
Figure 14:
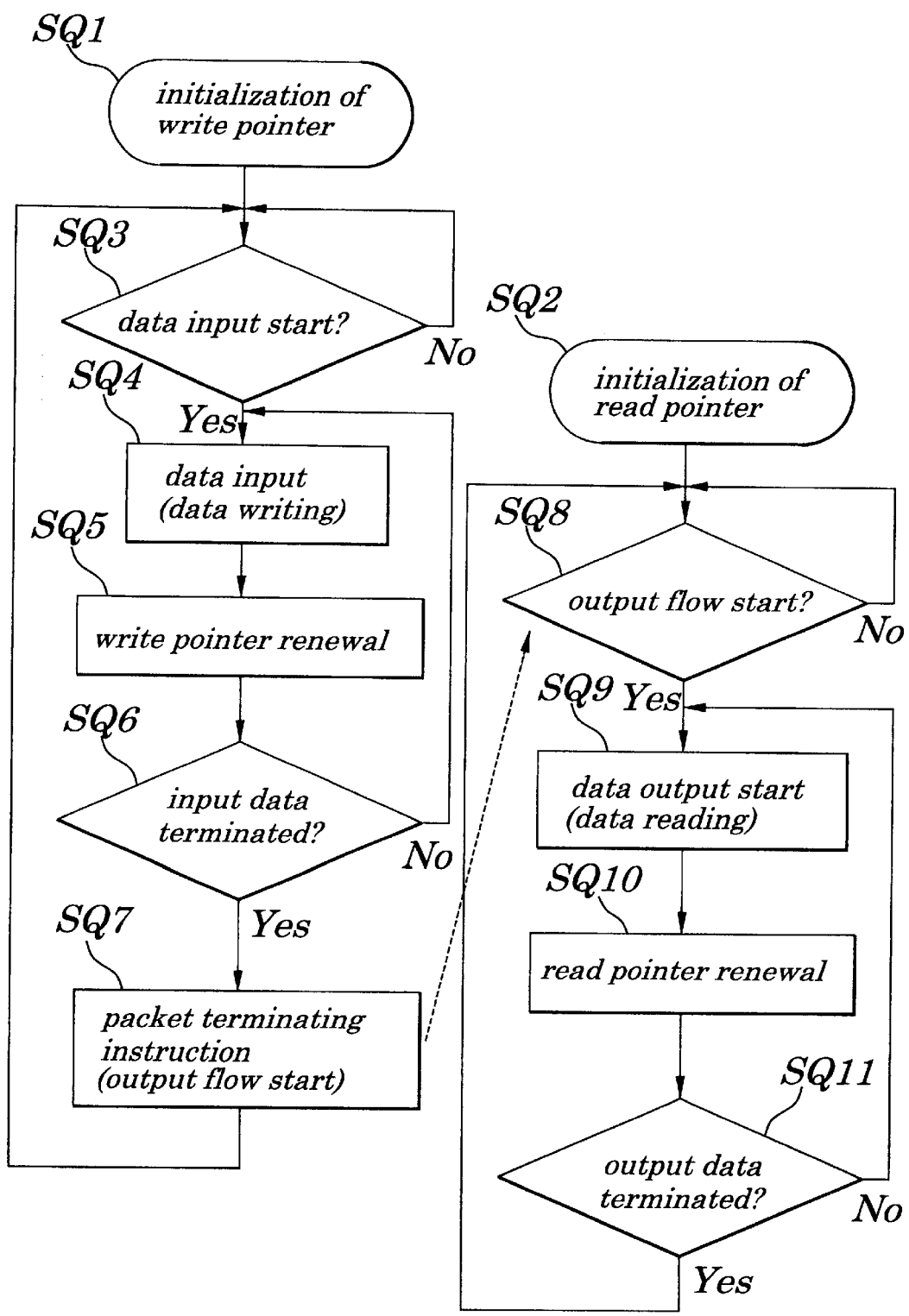
FIG. 14 is an explanatory diagram illustrating operational order of the conventional clock synchronizing circuit.

The clock synchronizing circuit 10 of this embodiment is a circuit having a function being able to output packet data incorporated into packet assembling and disassembling devices of a local area network in synchronization with an output clock (refer to FIG. 12) and, as shown in FIG. 1, is comprised of a memory 12, a write pointer generating circuit 15, a data holding detection circuit 16 and a reading pointer generating circuit 17.

Moreover, in this embodiment, MII interfaces defined in accordance with IEEE 802.3u are used as interfaces $33_1$ and $33_2$ (FIG. 12) to connect the packet assembling and disassembling devices of the local area net work, into which the above clock synchronizing circuit is built, to a packet receiving and sending device.

The memory 12 is so constructed that it can be independently readable and writable in a format of data string as shown in FIG. 3 and specifically it is comprised of a flip flop circuit.

The number of strings "N" representing storage capacity of the memory 12 is a sum of storage capacity given by the following formula (5) in the case where an input clock is faster than an output clock and by the following formula (6) in the case where an output clock is faster than an input clock;

$$N < n+1 \quad (5)$$

$$n \leq N \quad (6)$$

where a frequency of the input clock is A (Hz), a frequency of the output clock is B (Hz) and a maximum packet length is L (the number of clocks/packets) and, where, in the formulas (5) and (6), n=|A−B|×L/max (A, B) and, max (A, B)=A, when A≧B, and max (A, B)=B when A<B. N is an arbitrary natural number.

The formulas (5) and (6) represent a maximum phase difference made between the input and the output of a packet when the input data being in synchronization with the input clock per packet is outputted in synchronization with the output clock.

As shown in FIG. 3, data of each string having the number of strings "N" containing TXD field (4 bits), TXEN field (1 bit) and TXER field (1 bit). In FIG. 3, numbers or symbols including 1 to N are assigned after each field accordingly.

In this embodiment, the MII interface is used and the number of strings required can be obtained as described below.

The packet on the MII interface is comprised of a preamble, a start frame delimiter (SFD) and a data frame. The preamble contains 7 octets, the SFD contains one octet, and the maximum length of the data frame is 1518 octets. Therefore, in the MII interface defined by IEEE802.3u, a maximum length of one packet is 1526 octets. Thus, one packet contains 1526 octets, i.e., 3052 clocks in the MII interface. If the frequency of the clock of the MII interface is 25 MHz, since a variation of ±100 ppm (1 ppm being 1/10,000) is allowable both at the input and the output section in the clock synchronizing circuit, the frequency A or B of an input clock 14 or 18 having a higher frequency when a difference in frequency between the input clock 14 and the output clock 18 becomes the widest is 25.0025 MHz, while the frequency A or B of an input clock 14 or 18 having a lower frequency is 24.9975 MHz when the difference in frequency between the input clock 14 and the output clock 18 becomes the widest.

By substituting these frequencies A and B and the number of clocks 3052 per packet into a formula (5), N is obtained, the result of which is N<2×0.605+1, and the number of strings required for the memory 12 is 3.

Next, operations of the write pointer generating circuit 15 constituting the clock synchronizing circuit are described below. A write pointer generating circuit 15 is adapted to initialize a write pointer at the time when operations of the clock synchronizing circuit 10 are started and, at the same time, to write a write data unit into the memory 12. Every time a write data unit is written into the memory, the write pointer generating circuit 15 is also adapted to renew the write pointer in order to write a subsequent storage data unit out of packets inputted in response to the input clock 14 into the memory 12. Moreover, the write pointer generating circuit 15 feeds the write pointer 19 indicating a position of data storage in the memory 12 into which data strings are written to the read pointer generating circuit 17.

The data holding detection circuit 16 is used to detect whether effective data in data strings stored in the memory 12 is present or not. If it exists, the data holding detection circuit 16 outputs a read pointer renewing signal to the read pointer generating circuit 17. If it does not exist, the data holding detection circuit 16 output a read pointer re-initializing instruction signal (hereinafter referred also to as a "read pointer re-initializing instruction signal) to the read pointer generating circuit 17. The effective data is indicated by the TXEN field and TXER field in data strings shown in FIG. 3.

The read pointer generating circuit 17 is adapted to initialize the read pointer when operations of the clock synchronizing circuit 10 are started and, at the same time, to receive the pointer renewing signal from the data holding detection circuit 16. Every time a read data unit is read from the memory 12, the circuit 17 renews the read pointer in order to read a subsequent storage data unit out of packets stored in a memory 12 in response to the output clock 18 from a memory 12. When the circuit 17 receives a read pointer re-setting instruction signal from the data holding detection circuit 16 as well as the write pointer 19 used for writing an input clock immediately before the output clock reads a read data unit from the memory 12 from the write pointer generating circuit 15, it re-initializes so as to turn (or to change) the read pointer to the received write pointer.

The write pointer generating circuit 15 and the read pointer generating circuit 17 operate independently. The initialization of the write pointer generating circuit 15 and the read pointer generating circuit 17 means that, when the write pointer outputted from the write pointer generating circuit 15 points to any one of data storage positions in the memory 12, the pointer outputted from the read pointer generating circuit 17 is set so that it points to the same distance in the directions of a normal order and of a retrograde order from the data storage positions in the memory 12 to which the write pointer points.

In this embodiment, if the memory 12 is used as a ring buffer and the frequencies of the input and output clocks have a normal distribution, since the probability that the input clock 14 is faster than the output clock 18 is 50%, the read pointer 17 is initialized by pointing to a data storage position at the same distance and most apart in the direction of a normal order and in the direction of a retrograde order from the write pointer 19. More specifically, when the write pointer 19 points to the initial data storage position 1, the initial data storage position "m" of the read pointer is equal to n/2+1, which is positioned at the same distance in the direction of a normal order and in the direction of a retrograde order from the write pointer 19.

The re-initialization of the read pointer generating circuit 17 thus means that, when a read pointer re-initializing instruction signal is received from the data holding detection circuit 16 and the write pointer 19 is received from the write pointer generating circuit 15 used for writing at an input clock immediately before the output clock that reads a read data unit from the memory 12, a read pointer is set to a received write pointer.

Next, operations of this embodiment are hereinafter described.

When operations of the clock synchronizing circuit 10 are started, the write pointer generating circuit 15 and the read pointer generating circuit 17 as well as the memory 12 are initialized (steps SP1 and SP2 in FIG. 2). By this initialization, the write pointer 19 points to an initial data storage position 1 and the read pointer points to an initial data storage position "m" (m=n/2+1).

A write data unit [TXD (4 bits), TXEN (1 bit), TXER (1 bit)] is written at a data storage position (step SP3) to which a write pointer outputted from the write pointer generating circuit 15 point and, after the writing, a write pointer is renewed (step SP4).

Reading processing is performed independently of and in parallel with the writing processing. The reading processing is started from the data storage position to which the initialized read pointer points (step SP5).

The judgement as to whether effective data is present or not in a read data string is made by the data holding detection circuit 16 (step SP6). When the reading is started, contents of a memory is cleared and a read data string is outputted as a data string, for example, of all data set to zeros.

Because the memory has not yet effective data, the data holding detection circuit 16 judges that there is no effective data (step SP6, negative judgement), and the circuit 16 outputs a read pointer re-initializing instruction signal and the read pointer is re-initialized (re-set) (step SP7). The reading processing following the re-initialization occurs from the data storage position in the memory 12 which is pointed by the read pointer (the pointer re-initialized to a position of storage data written in accordance with a clock existing immediately before a subsequent clock) re-initialized by being returned to step SP5.

The re-initialization of the read pointer shown in the embodiment with the number of strings of the memory 12 being 3 is hereafter described by referring to FIGS. 4 to 7.

First, the re-initialization is described in the case where the frequency of an output clock is faster than that of an input clock by referring to FIGS. 4 and 5.

In FIG. 4, lower-case alphabetic characters "a" to "m" represent a rise of the input clock (timing for writing data strings) and numerals "1" to "15" represent a rise of the output clock (timing for reading data strings).

FIG. 5 is a diagram expanding a relation between writing and reading of the memory 12 in time sequence. In the leftmost longitudinal column in FIG. 5 are shown a first string (1), a second string (2) and a third string (3) of the memory 12 having a capacity of three strings. FIG. 5 shows only part of the relations of timing shown in FIG. 4. From the right side of a leftmost longitudinal column are in order positioned first, second and third columns and so on which are sequentially referred to. Each longitudinal column represents reading timing and writing timing alternately.

Lower-case alphabetic characters in each longitudinal column represent the writing timing shown in FIG. 4 and Arabic numerals represent the reading timing shown in FIG. 4. Moreover, underlined lower-case alphabetic characters represent the writing timing, simultaneously showing that effective data is written at the write timing, while non-underlined lower-case alphabetic characters represent the writing timing and effective data is not written at the write timing.

In FIG. 5, a first longitudinal column shows the reading timing "3" which reads a third string in the memory 12. The writing timing immediately before the reading timing "3" in FIG. 5 corresponds to the writing timing "b" shown in FIG. 4 and the writing is made at a writing timing "b" on a first string (1) of a memory. A write pointer 19 representing the first string (1) of the memory 12 is read from the write pointer generating circuit 15 which is then fed to the read pointer generating circuit 17.

As is apparent from the timing chart in FIG. 4, at this timing, the memory 12 has no effective data, as a read pointer re-initialized instruction signal is generated from the data holding detection circuit 16 and is fed to the read pointer generating circuit 17 where the read pointer is turned to (or changed to) the write pointer 19. The change of the write pointer represents re-initialization shown in this embodiment. The re-initialized read pointer is indicated as a numeral (1) below the reading timing "3" shown in the frame, into which the third string in the memory 12 is assigned, in the first longitudinal column.

The second longitudinal column shows a writing timing "c". The third longitudinal column shows a reading timing "4". The read pointer of the reading timing "4" is a re-initialized read pointer 1 described in the first longitudinal column. After reading of the first string (1) in the memory 12 is performed by this read pointer 1, the existence of the effective data is judged by the data holding detection circuit 16. As shown in the timing chart in FIG. 4, as no effective data is present, the same re-initialization as described in the first longitudinal column is carried out. As a result, as seen in the third longitudinal column, reading timing is shown as "4" and the re-initialized read pointer is shown as (2) below the reading timing "4".

The same operations as seen in the second and third columns are performed in the fourth and fifth longitudinal columns. These results are shown in the corresponding longitudinal column.

In the sixth and seventh longitudinal columns, the same operations as in the preceding longitudinal columns are performed except following point of difference. The point of difference is that, when the effective data in the seventh longitudinal column is judged to exist, because, at the writing timing "e", a data string (effective data) "e" is written on the first string (1) in a memory, the read pointer is not re-initialized but renewed by +1 only. Therefore, a renewed value (1) of the read pointer is shown below the reading timing "6" shown in the seventh column.

Because the judgement on the existence of the effective data for each reading timing hereafter to the twentieth column is positive, the same operations as those described in the sixth and seventh longitudinal columns are merely repeated, the description is omitted accordingly.

In the reading timing shown in the twenty-first longitudinal column, as depicted in FIG. 5, since no effective data exists in the memory 12, as is apparent from the above description, the re-initialization occurs, causing the reading pointer to indicate a write pointer (2) at the timing immediately before the reading pointer. This read pointer is shown as a numeral (2) below the reading timing "14" in the twenty-first column.

Next, the re-initialization in the case where the frequency of the input clock is higher than that of the output clock.

FIGS. 6 and 7 are diagrams each expanding, in time series, the relations between the writing and reading operations shown in the timing chart and in the memory 12, which correspond to FIGS. 4 and 5.

In the writing processing performed in response to an input clock following one or more re-initialized output clock, since first data string of the packet is written in the memory 12 and effective data is present in the memory 12, the data holding detection circuit 16 makes a positive judgement that there is effective data and outputs a read pointer renewing signal (in the case of "YES" in Step SP6). In response to the read pointer renewing signal outputted from the data holding detection circuit 16, a read pointer is renewed by the addition of "1" to the read pointer (Step SP8). Moreover, a reverse symbol of the read pointer re-initializing signal may be used as the read pointer renewing signal.

Such renewal of the write pointer and read pointer is carried out continuously (Step SP4 and SP8).

By the sequential renewal of the write pointer, each data string constituting a packet is sequentially written to a storage position of data to which the renewed write pointer points.

Also, by the sequential renewal of the read pointer, a string of all data set to zeros is sequentially outputted from the memory 12 and finally the read pointer points to the initial value 1 of the read pointer. Each output data outputted until the renewal that "the initial value 1 of the write pointer is pointed" to by the read pointer is made is a data string, for example, a string of all data set to zeros, which are outputted as output data 13.

Thus, in response to N times of output clocks following output clocks existing after at a data position where the initial value 1 of the write pointer is pointed to by the read pointer, N pieces of data strings are sequentially read from each position of data storage pointed by each read pointer (i.e., N pieces of data storage position counted from a data storage position 1 storing a first data string of the packet). The number string of data P (P=kN, k being an arbitrary positive number) constituting a packet used when input data being in synchronization with an input clock is outputted in synchronization with an output clock is written into the memory 12 and, until they are all read, the memory having N strings of memory capacity is used repeatedly.

This causes data string of the packet received at the input clock having a frequency A [Hz] at the input of the memory 12 to be outputted to the output of the memory 12 at the output clock having a frequency B [Hz] without causing omission or duplication of data string.

Without causing the omission or duplication of the packet data, the packet data inputted in synchronization with the input clock having a frequency A [Hz] is outputted in synchronization with the output clock having a frequency B [Hz] (the input clock having a frequency A [Hz] can be converted to the output clock having a frequency B [Hz]).

Thus, according to this embodiment, though the input clock 14 and the output clock 18 are set so as to have the same frequency, even if, due to variations in the stability of frequency of each clock source, a difference in frequency between the input clock 14 and the output clock 18 occurs, the packet data inputted in synchronization with the input clock 14 can be outputted to the output clock 18.

Assuming that a maximum packet length of one packet is L, as a storage capacity required for synchronization, the conventional clock synchronizing circuit requires storage capacity having a maximum packet length "L" of one packet however, according to this embodiment, the required storage memory can be reduced by (L−N) strings. The reduction of the storage capacity enables a delay in transmission to be shortened.

In addition, the configuration of this embodiment has an advantage in integration of a clock synchronizing circuit on a semiconductor chip.

A specific advantageous effect is that the number of strings required for synchronization in the memory 12 is 3. In the conventional clock synchronizing circuit, it is 3052. Therefore, the storage capacity required for synchronization can be reduced by great 99.9%. The great reduction in storage capacity leads not only to great shortening of a delay in transmission of packets but also to great advantageous integration of the clock synchronizing circuit on semiconductor chips.

Second Embodiment

Figure 8:
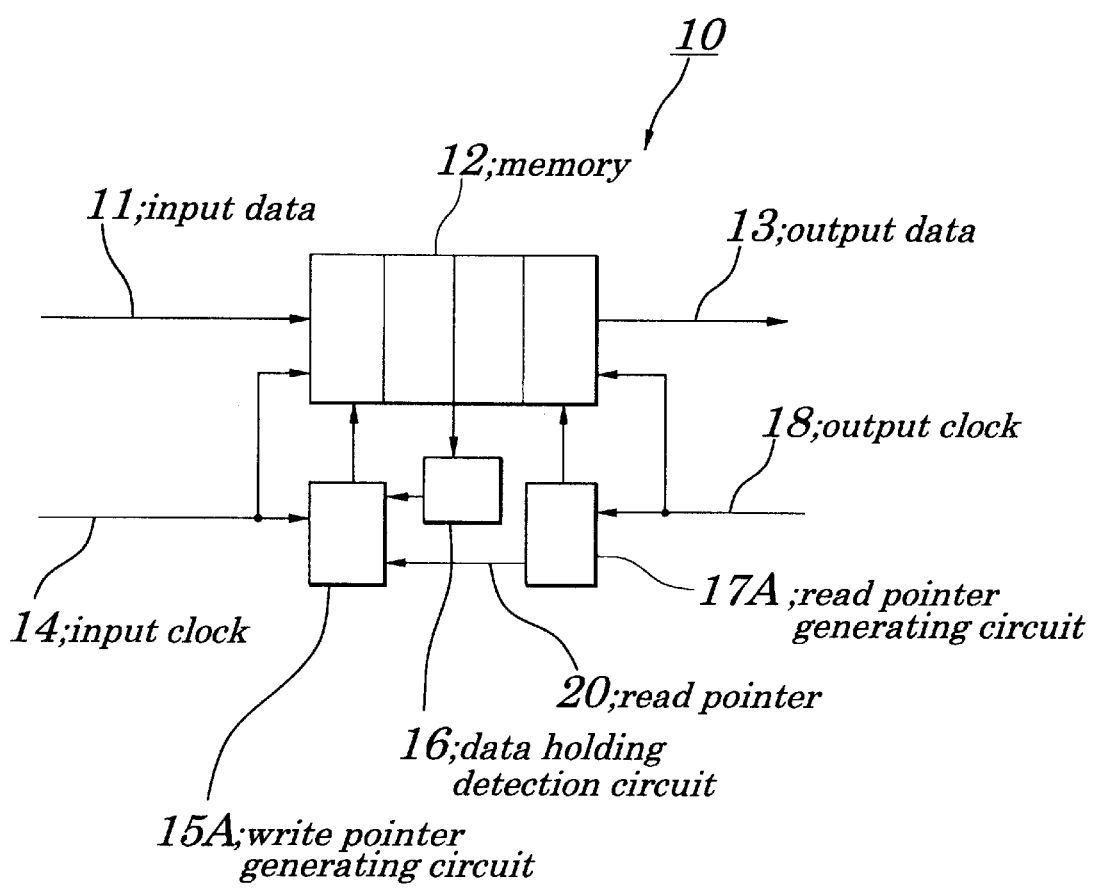
FIG. 8 is a block diagram approximately showing a configuration of a clock synchronizing circuit according to a second embodiment of the present invention.

FIG. 8 is a block diagram approximately showing a configuration of a clock synchronizing circuit according to a second embodiment of the present invention.

Figure 9:
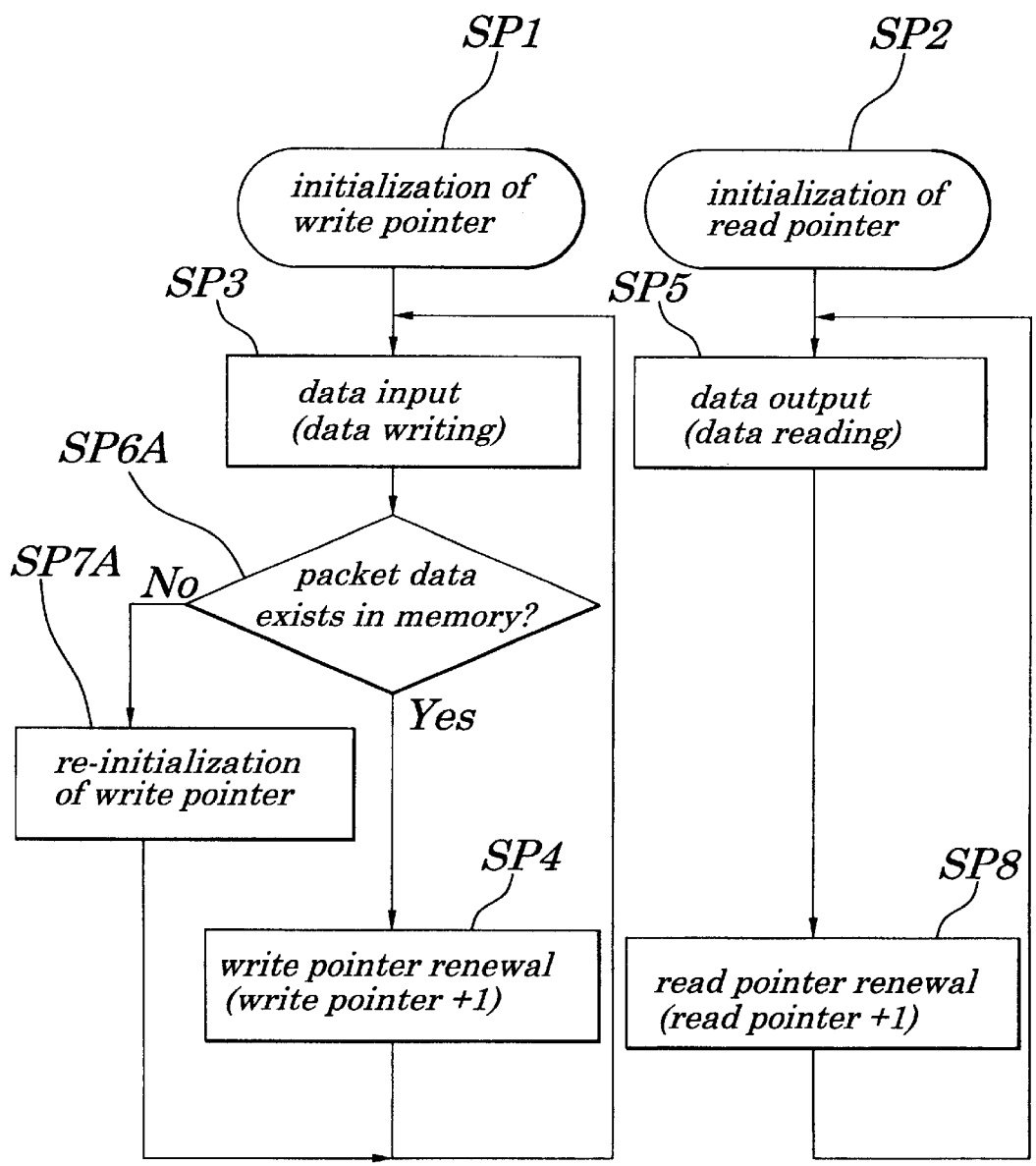
FIG. 9 is an explanatory diagram showing operational procedures of the clock synchronizing circuit.

FIG. 9 is an explanatory diagram showing operational procedures of the clock synchronizing circuit.

The configurations of this embodiment differ from those of the first embodiment greatly in that a judgement on whether effective data is stored in the memory 12 or not is made by writing processing and, at the same time, a read pointer 20, which is a data string read from the memory 12 at the output clock existing immediately before the re-initialized input clock, is fed from a read pointer generating circuit 17A to a write pointer generating circuit 15A.

A write pointer re-initializing instruction signal or a write pointer renewal signal corresponding respectively to a negative decision or a positive decision detected by a data holding detection circuit 16 is fed from the data holding detection circuit 16 to the write pointer generating circuit 15A. Therefore, the explanatory diagram in FIG. 9 includes Step SP6A wherein a judgement whether there is effective data in the data string stored in the memory 12 in the writing processing and Step SP7A wherein a write pointer re-initializing instruction signal is outputted from the data holding detection circuit 16 and, by feeding a read pointer 20 produced at an output clock existing immediately before an input clock which has outputted the write pointer re-initializing instruction signal from a read pointer generating circuit 17A to a write pointer generating circuit 15A, a write pointer is re-initialized. The read pointer generating circuit 17A produces the read pointer only in response to the output clock.

Moreover, the configuration of this embodiment is the same as for the first embodiment except those described above. Accordingly, like reference characters designate corresponding parts shown in FIGS. 1 and 2.

Next, operations of the second embodiment are hereinafter described in FIGS. 8 and 9.

Operations in the second embodiment are the same as those in the first embodiment in that the memory 12, write pointer and read pointer are all initialized at the start of operations for initialization (Steps SP1 and SP2), and the data string is written into the memory 12 (Step SP3).

The judgement on whether the data string written by the memory 12 contains effective data is made by the data holding detection circuit 16 (Step SP6A).

While a packet is inputted after a lapse of a predetermined time and the first string data in the packet is written into the data storage position in the memory 12 to which the initialized or re-initialized write pointer points, a negative decision is obtained by the data holding detection circuit 16, and when a write pointer re-initializing instruction signal is produced by the data holding detection circuit 16 and a read pointer 20 read at the output clock existing immediately before the input clock used to generate a write pointer re-initializing instruction signal is fed from the read pointer generating circuit 17A to the write pointer generating circuit 15A, the write pointer generating circuit 15A converts the write pointer to the read pointer 20 to re-initialize the write pointer.

When the first data string of the packet is written to a data storage position in the memory 12 to which the initialized or re-initialized write pointer points, a positive decision is obtained by the data holding detection circuit 16 and a write pointer renewal signal is outputted from the data holding detection circuit 16 (in the case of "YES" in Step SP6A). In response to the positive decision signal, the write pointer generating circuit 15A is adapted to renew the write pointer by +1 only (Step SP4) and then to start writing of the data String of the packet. The writing of the last data string of the packet is hereinafter carried out in the same manner as above.

After termination of writing of the last data of a packet string by the time when the subsequent packet reaches, a loop returning from Step SP3, SP6A, SP7A and SP3 is repeated. In the reading processing which is carried out independently of the writing processing, after the read pointer is initialized (Step SP2) at the start of operations of synchronization, the data storage position in the memory 12 to which the read pointer points for every output clock is read (Step SP5) and the read pointer is renewed (Step SP8).

Thus, according to this embodiment, though the input clock 14 and the output clock 18 are set so as to have the same frequency, even if, due to variations in the stability of frequency of each clock source, a difference in frequency between the input clock 14 and the output clock 18 occurs, the packet data inputted in synchronization with the input clock 14 is outputted to the output lock 18. Assuming that a maximum packet length of one packet is L, as a storage capacity required for synchronization, the conventional clock synchronizing circuit requires storage capacity having a maximum packet length "L" of one packet however, according to this embodiment, the required storage memory can be reduced by (L–N) strings. The reduction of the storage capacity enables a delay in transmission to be shortened.

In addition, the configuration of this embodiment has an advantage in integration of a clock synchronizing circuit on a semiconductor chip.

A specific advantageous effect is that the number of strings required for synchronization in the memory 12 is 3. In the conventional clock synchronizing circuit, it is 3052. Therefore, the storage capacity required for synchronization can be reduced by great 99.9%. The great reduction in storage capacity advantageously leads not only to great shortening of a delay in transmission of packets but also to greatly reduced occupied area in integrating the clock synchronizing circuit on semiconductor chips.

Third Embodiment

Figure 10:
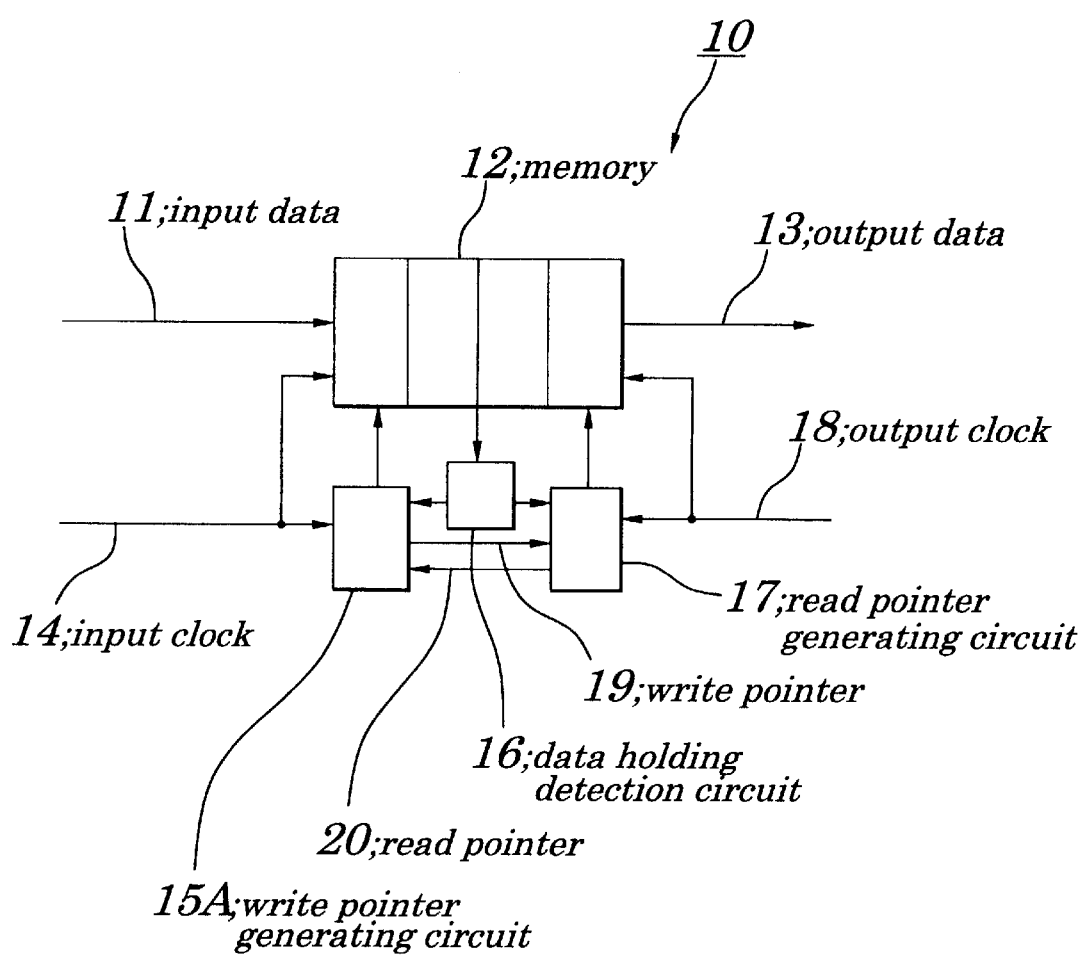
FIG. 10 is a block diagram approximately showing a configuration of a clock synchronizing circuit according to a third embodiment of the present invention.
Figure 11:
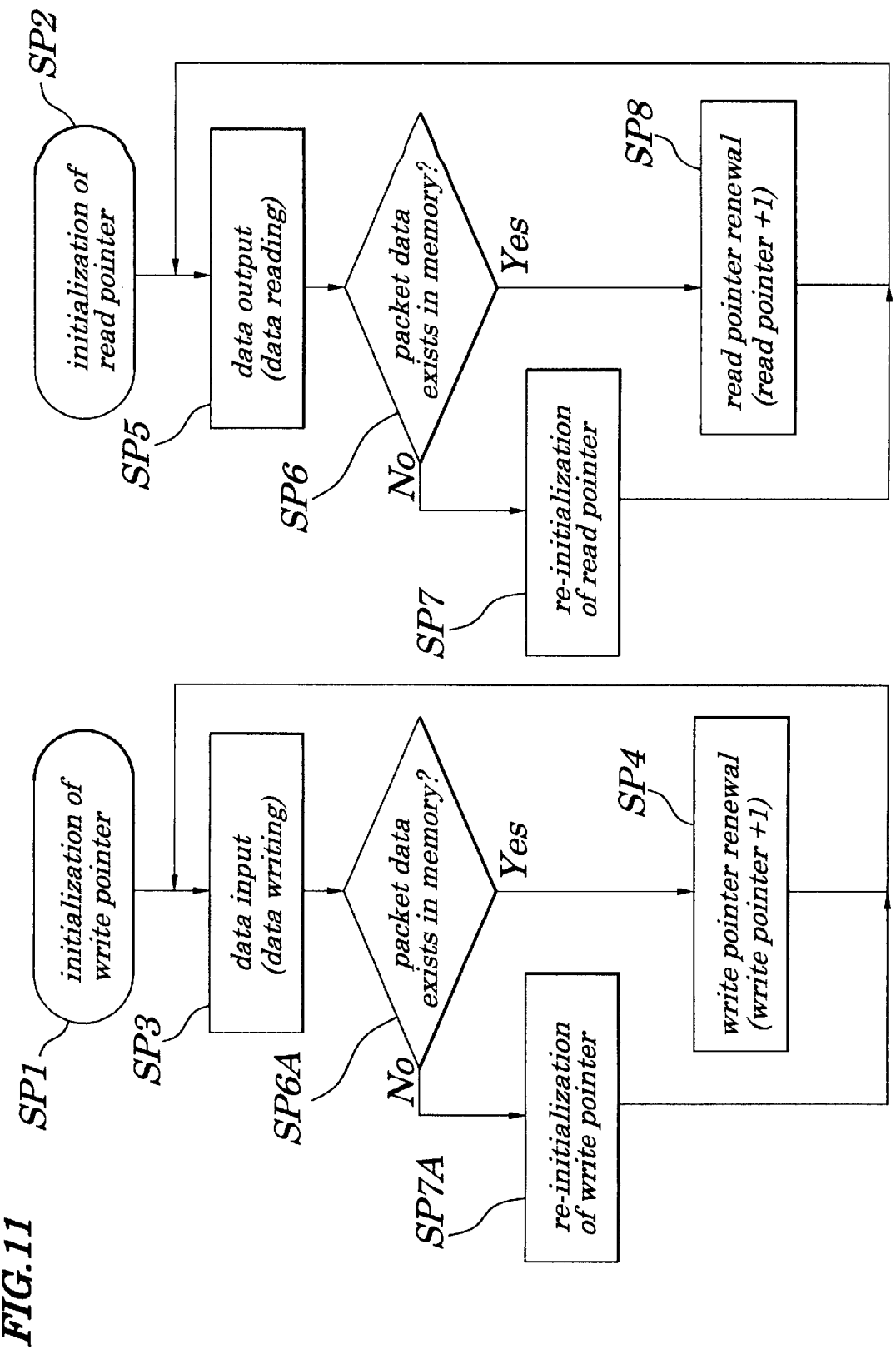
FIG. 11 is an explanatory diagram showing operational procedures of the clock synchronizing circuit.

FIG. 10 is a block diagram approximately showing a configuration of a clock synchronizing circuit according to a third embodiment of the present invention. FIG. 11 is an explanatory diagram showing operational procedures of the clock synchronizing circuit.

The configurations of this embodiment differ from those of the first embodiment greatly in that a judgement on whether effective data is stored in the memory 12 or not is made by the writing and reading processing and, at the same time, a read pointer 20, which is a data string read from the memory 12 at the output clock existing immediately before the re-initialized input clock, is fed from a read pointer generating circuit 17A to a write pointer generating circuit 15A and a write pointer 20, which is a data string write to the memory 12 at the input clock existing immediately before the re-initialized output clock, is fed from the write pointer generating circuit 15A to the read pointer generating circuit 17.

A write pointer re-initializing instruction signal or a write pointer renewal signal corresponding respectively to a negative decision or a positive decision detected by a data holding detection circuit 16 is fed to the write pointer generating circuit 15A and the read pointer generating circuit 17.

Therefore, the explanatory diagram in FIG. 11 includes Step SP6A wherein a judgement whether there is effective data in the data string stored in the memory 12 in the writing processing and Step SP7A wherein a write pointer re-initializing instruction signal is outputted from the data holding detection circuit 16 and a write pointer is re-initialized when a read pointer 20 used to read a read data unit at the output clock existing immediately before the input clock at which the write pointer re-initializing instruction signal is outputted is outputted from the read pointer generating circuit 17A.

Moreover, the configuration of this embodiment is the same as for the first embodiment except those described above. Accordingly, like reference characters designate corresponding parts shown in FIGS. 10 and 11.

Next, operations of the third embodiment are hereinafter described in FIGS. 10 and 11.

Operations in the third embodiment are the same as those in the first embodiment in that the memory 12, write pointer and read pointer are all initialized at the start of operations (Steps SP1 and SP2 in FIG. 11), and the data string is written into the memory 12 (Step SP3).

The judgement on whether the data string written by the memory 12 contains effective data is made by the data holding detection circuit 16 (Step SP6A).

While a packet is inputted at the time of, or after starting operations and the first string data in the packet is written into the data storage position in the memory 12 to which the initialized or re-initialized write pointer points, a re-initializing instruction signal is produced by the data holding detection circuit 16, and when a read pointer generated at the output clock existing immediately before the input clock used to output a write pointer re-initializing instruction signal is fed from the read pointer generating circuit 17A, the write pointer generating circuit 15A is adapted to re-initialize the write pointer by converting the write pointer to the read pointer fed as above. Similar re-initialization of the read pointer is carried out.

That is, while a packet is inputted at the time of, or after starting operations and the first string data in the packet is written into the data storage position in the memory 12 to which the initialized or re-initialized write pointer points, a re-initializing instruction signal is produced by the data holding detection circuit 16, and when a write pointer 19 generated at the input clock existing immediately before the output clock used to output a read pointer re-initializing instruction signal is fed from the write pointer generating circuit 15A, the read pointer generating circuit 17 is adapted to re-initialize the read pointer by converting the read pointer to the write pointer fed as above.

When a first data string of a packet is written into the data storage position of the memory 12 to which an initialized or re-initialized write pointer points, a write pointer renewing signal is outputted from the data holding detection circuit 16 (in the case of "YES" in Step SP6A). In response to the write pointer renewing signal, the write pointer generating circuit 15A renews the write pointer by +1 (Step SP4) and starts writing of the subsequent data string of the packet. In the same manner as above, the last data string of the packet is written. After the termination of writing of the last data string by the time when the subsequent packet reaches, a loop returning from Step SP3, SP6A, SP7A and SP3 is repeated.

Reading processing is carried out independently of this writing processing. The reading processing is started from a data storage position to which the initialized read pointer points (Step SP5). Whether the written data string has effective data or not is judged by the data holding detection circuit 16 (Step SP6). When reading is started, the memory 12 is cleared and the outputted data is outputted as a string of all data set to zeros.

Since the memory 12 does not yet contain effective data, the judgement by the data holding detection circuit 16 (the judgement in Step 6) turns out to have no effective data (i.e., negative judgement) (in the case of "NO" in Step SP6), and re-initialization (re-setting) of the read pointer is carried out in the same manner as in the first embodiment. Reading is performed after the procedure is returned to Step SP5.

The re-initialization of the read pointer continues to be carried out until the first data string of the packet in memory 12 is written. After an input clock used to write the first data string into the memory 12 appears, since there exists effective data in the memory 12, the judgement turns out to have the effective data, causing a read pointer renewing signal to be outputted from the data holding detection circuit 16 (in the case of "Yes" in Step SP6). By adding +1 to the read pointer, the read pointer is renewed (Step SP8).

The renewal of the write pointer and read pointer is continuously made (Steps SP4 and SP8).

By sequential renewal of the write pointer, each data string constituting the packet is written sequentially into the data storage position to which a renewed write pointer points. Also, by sequential renewal of the read pointer, a string of all non-effective data is outputted from the memory 12 as outputted data and, finally, the read pointer reaches a data storing position where data string of the packet is written by the write pointer. Before the read pointer reaches the data storage position, the data string cleared by initialization of the memory 12, for example, strings of all data set to zeros are outputted as output data 13, however, when the read pointer reaches the data storage position, data string of the packet is sequentially outputted as output data 13.

Thus, the number of strings P of data constituting a packet to be synchronized is written into the memory 12 and, until all of them is read, the memory having memory capacity N is repeatedly used.

After data inputted in synchronization with an input clock is outputted in synchronization with an output clock, the re-initialization of a pointer is continued in both writing and reading processing until the subsequent packet is inputted.

This causes the data string received at an input clock having a frequency A [Hz] to be outputted to the output side of the memory 12 at an output clock having a frequency B, without causing the omission or duplication of the data string. That is, without causing the omission or duplication of the packet data, the packet data inputted in synchronization with the input clock having a frequency A [Hz] is outputted in synchronization with the output clock having a frequency B [Hz] (the input clock having a frequency A [Hz] can be converted to the output clock having a frequency B [Hz]).

Thus, according to this embodiment, though the input clock 14 and the output clock 18 are set so as to have the same frequency, even if, due to variations in the stability of frequency of each clock source, a difference in frequency between the input clock 14 and the output clock 18 occurs, the packet data inputted in synchronization with the input clock 14 can be outputted to the output clock 18.

Assuming that a maximum packet length of one packet is L, as a storage capacity required for synchronization, the conventional clock synchronizing circuit requires storage capacity having a maximum packet length "L" of one packet however, according to this embodiment, the required storage memory can be reduced by (L−N) strings. The reduction of the storage capacity enables a delay in transmission to be shortened.

In addition, the configuration of this embodiment has an advantage in integration of a clock synchronizing circuit on a semiconductor chip.

A specific advantageous effect is that the number of strings required for synchronization in the memory 12 is 3. In the conventional clock synchronizing circuit, it is 3052. Therefore, the storage capacity required for synchronization can be reduced by great 99.9%. The great reduction in storage capacity advantageously leads not only to great shortening of a delay in transmission of packets but also to greatly reduced occupied area in integrating the clock synchronizing circuit on semiconductor chips.

It is apparent that the present invention is not limited to the above embodiments but may be changed and modified without departing from the scope and spirit of the invention. For example, the present invention can be carried out in the case where the input clock 14 and the output clock 18 differ in frequency or where the input clock 14 and the output clock 18 differ and vary in frequency as well.

Also, this invention is carried out not only in the technical field of a local area network and transmission of digital signals in the case where there is variation or difference in input and output clocks.

Moreover, in these cases, semiconductor memories in which input and output can be accessed independently can be used as a memory.

In the above embodiments, the clock synchronizing circuit is comprised of hardware, however, part of it can be comprised of software.

According to the present invention, the clock synchronizing circuit is so configured that either or both of a write pointer and a read pointer can be re-initialized even if there is difference in frequency between the input and output clocks, storage capacity, required for outputting data inputted in synchronization with the input clock in synchronization with the output clock, can be reduced. If the difference in frequency is small in particular, the reduced amount is great. This allows great reductions in a delay in transmission of packets. This also enables a great reduction of storage capacity, simplification and miniaturization of the synchronizing circuit and its dropping in prices.

It is thus apparent that the present invention is not limited to the above embodiments but may be changed and modified without departing from the scope and sprit of the invention.

Finally, the present application claims the priority based on Japanese Patent Application No. Hei10-318322 filed on Oct. 22, 1998, which is herein incorporated by reference.

What is claimed is:

1. A method of synchronizing first clocks and second clocks for transferring data from a first circuit operated at said first clocks through a storing means being accessible independently to its input and output to a second circuit operated by said second clocks comprising the steps of;
    storing said data fed by said first circuit;
    detecting whether said data stored in said storing means is effective data;
    renewing, if a decision is positive, an access pointer of said storing means in response to each of said first clocks or each of said second clocks;
    re-initializing, if a decision is negative, said access pointer of said storing means in response to each of said first clocks or each of said second clocks; and
    outputting data inputted in synchronization with said first clocks in synchronization with said second clocks by accessing said storing means using said access pointer.

2. The method according to claim 1, wherein a frequency of said first clocks is different from that of said second clocks.

3. The method according to claim 1, wherein a width of storage capacity N of said storing means is a sum of a width of storage capacity given by a following formula (1) derived in the case where an output clock is faster than an input clock and a width of storage capacity given by a following formula (2) derived in the case where an input clock is faster than an output clock;

$$N < n+1 \quad (1)$$
$$N <= n \quad (2)$$

where $n=|A-B| \times L/\max(A, B)$, wherein A is a frequency of said first clocks, B is a frequency of said second clocks and L is a maximum packet length, and max(A, B) represents that max(A, B)=A if A>=B and max (A, B)=B if A<B, and N is an arbitrary natural number.

4. The method according to claim 1, wherein said re-initialization is performed only on said access pointer of said second circuit.

5. The method according to claim 1, wherein said re-initialization is performed only on said access pointer of said first circuit.

6. The method according to claim 1, wherein said re-initialization is performed on said access pointers of both first and second circuits.

7. A device for synchronizing first clocks and second clocks for transferring data from a first circuit operated at said first clocks through a storage means being accessible independently to its input and output to a second circuit operated by said second clocks comprising:
    a storing means being accessible independently to its input and output;
    a detecting means to detect whether data stored in said storing means is effective data;
    an access pointer generating means to renew an access pointer of said storing means, when said detecting means shows a positive decision, in response to each of said first clocks or each of said second clocks and to reinitialize an access pointer of said storing means, when said detecting means shows a negative decision, in response to one of said first and second clocks; and
    a means to output data inputted in synchronization with said first clocks in synchronization with said second clocks by accessing said storing means using an access pointer outputted from said access pointer generating means.

8. The device according to claim 7 wherein a frequency of said first clocks is different from that of said second clocks.

9. The device according to claim 7, wherein a width of storage capacity N of said storing means is a sum of a width of storage capacity given by a following formula (3) derived in the case where an output clock is faster than an output clock and a width of storage capacity given by a following formula (4) derived in the case where an input clock is faster than an output clock;

$$N < n+1 \quad (3)$$
$$N <= n \quad (4)$$

where $n=|A-B| \times L/\max (A, B)$, wherein A is a frequency of said first clock, B is a frequency of said second clock and L is a maximum packet length, and max (A, B) represents that max (A, B)=A if A>=B and max (A, B)=B if A<B and N is an arbitrary natural number.

10. The device according to claim 7, wherein re-initialization of said access pointer using said access pointer generating means is performed only on said access pointer of said second circuit.

11. The device according to claim 7, wherein re-initialization of said access pointer using said access pointer generating means is performed only on said access pointer of said first circuit.

12. The device according to claim 7, wherein re-initialization of said access pointer using said access pointer generating means is performed on said access pointer of both said first and second circuits.

* * * * *